US007246037B2

(12) United States Patent
Evans

(10) Patent No.: US 7,246,037 B2
(45) Date of Patent: Jul. 17, 2007

(54) METHODS AND APPARATUS FOR AN IMPROVED SIGNAL MONITOR

(75) Inventor: Scott Evans, Gilbert, AZ (US)

(73) Assignee: Eberle Design, Inc., Phoenix, AZ (US)

( * ) Notice: Subject to any disclaimer, the term of this patent is extended or adjusted under 35 U.S.C. 154(b) by 0 days.

(21) Appl. No.: 11/184,418

(22) Filed: Jul. 19, 2005

(65) Prior Publication Data

US 2006/0015295 A1 Jan. 19, 2006

Related U.S. Application Data

(60) Provisional application No. 60/589,301, filed on Jul. 19, 2004.

(51) Int. Cl.
*G06F 19/00* (2006.01)
(52) U.S. Cl. .................. 702/183; 340/931; 315/132; 701/1; 714/38
(58) Field of Classification Search ................ 702/183; 340/907, 641, 642, 931, 916, 912; 701/1; 714/38; 315/132, 291, 307, DIG. 7
See application file for complete search history.

(56) References Cited

U.S. PATENT DOCUMENTS

| | | | | | |
|---|---|---|---|---|---|
| 3,729,706 | A | * | 4/1973 | Hein | 340/908 |
| 3,902,156 | A | * | 8/1975 | Hill | 340/931 |
| 4,135,145 | A | * | 1/1979 | Eberle | 340/931 |
| 4,250,483 | A | * | 2/1981 | Rubner | 340/910 |
| 4,257,029 | A | * | 3/1981 | Stevens | 340/915 |
| 4,383,240 | A | * | 5/1983 | Staats, Jr. | 340/915 |
| 4,586,041 | A | * | 4/1986 | Carlson | 340/931 |
| 4,757,417 | A | * | 7/1988 | Futsuhara | 361/86 |
| 5,327,123 | A | * | 7/1994 | Heimann et al. | 340/916 |
| 5,387,909 | A | * | 2/1995 | Neel et al. | 340/931 |
| 5,612,596 | A | * | 3/1997 | Wiese | 315/291 |
| 5,734,116 | A | | 3/1998 | Schaeffer | |
| 6,965,322 | B2 | * | 11/2005 | Metz et al. | 340/907 |
| 2005/0046597 | A1 | * | 3/2005 | Hutchison et al. | 340/917 |
| 2005/0110660 | A1 | | 5/2005 | Jacobs | |
| 2005/0116837 | A1 | | 6/2005 | Jacobs | |
| 2005/0138477 | A1 | * | 6/2005 | Liddy et al. | 714/38 |
| 2005/0138488 | A1 | | 6/2005 | Jacobs | |
| 2006/0092043 | A1 | * | 5/2006 | Lagassey | 340/907 |
| 2006/0095199 | A1 | * | 5/2006 | Lagassey | 701/117 |
| 2006/0155427 | A1 | * | 7/2006 | Yang | 701/1 |

OTHER PUBLICATIONS

International Search Report for PCT/US2005/25490, mailed Aug. 11, 2006.

(Continued)

*Primary Examiner*—Carol S. W. Tsai
(74) *Attorney, Agent, or Firm*—Ingrassia Fisher & Lorenz, P.C.

(57) ABSTRACT

A malfunction management unit (MMU) includes advanced diagnostic and set-up capabilities accessed through a display-based user interface. In general, the MMU is capable of displaying (1) monitor status information, wherein the monitor status information includes information relating to the status of at least a portion of the input signals; and (2) diagnostic information, wherein the diagnostic information includes an indication of fault type, and indication of faulty signals, and troubleshooting information associated with said fault type and relevant faulty signals. The diagnostic information includes a textual interpretation of the results of a field check analysis.

14 Claims, 7 Drawing Sheets

OTHER PUBLICATIONS

Information Sheet by Eberle Design Inc., entitled "MMU-16E Malfunction Management Unit, Introducing A New Standard of Safety and Diagnostic Capabilities", dated Oct. 19, 2001 (p. 1).
Operations Manual by Eberle Design Inc., entitled "MMU-16E Series, RMS Signal Monitor", Revision dated Jan. 2001 (pp. 1-24).
Information Sheet by Eberle Design Inc., entitled "SSM-LE Series, Enhanced NEMA Signal Monitor Unit", dated Sep. 2001 (p. 1).
Operations Manual by Eberle Design Inc., entitled "SSM-LE Series, RMS Signal Monitor", Revision dated Dec. 2000 (pp. 1-20).

Webpage Information Sheet at www.peek-trafic.com/products/cabinets/doublediamond.html, by Quixote Traffic Corporation, entitled "Double Diamond NEMA MMU and Conflict Monitor", webpage printed Sep. 7, 2005 (pp. 1-2).
Operating Manual by Peek Traffic Systems, Inc., entitled Double Diamond MMU Operating Manual, Production Release Version 1, dated Aug. 7, 2000 (pp. 1-74).

* cited by examiner

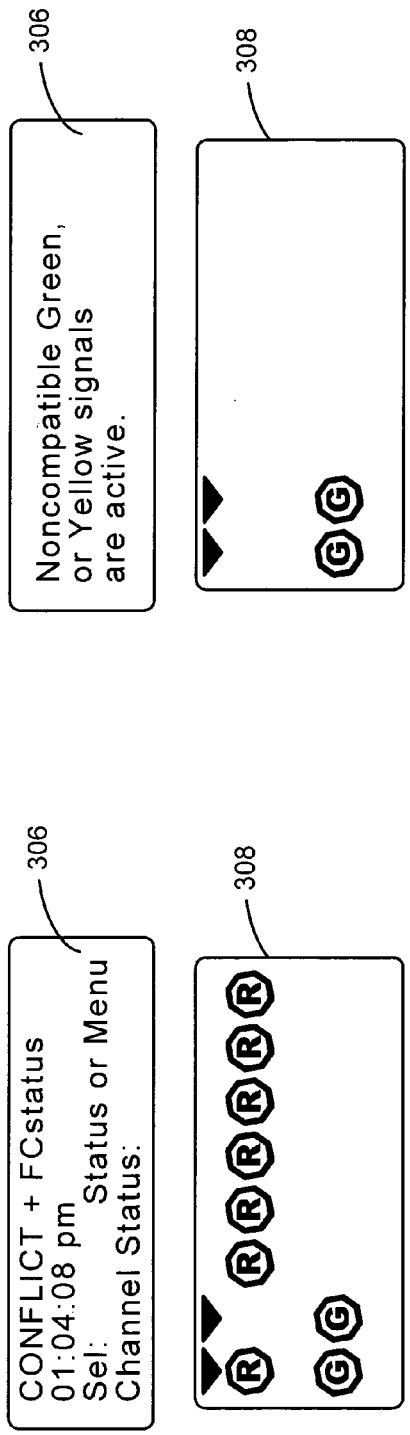
FIG. 7A
FIG. 7C
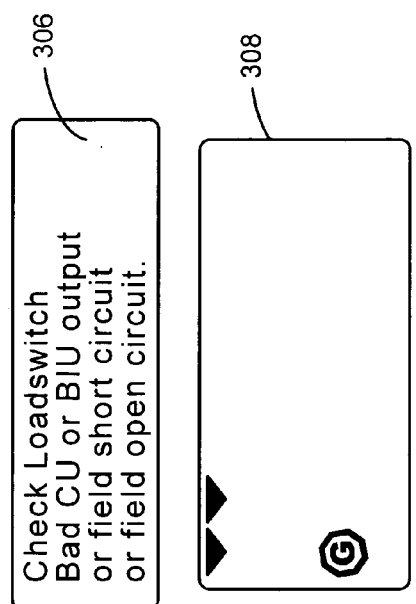
FIG. 7B
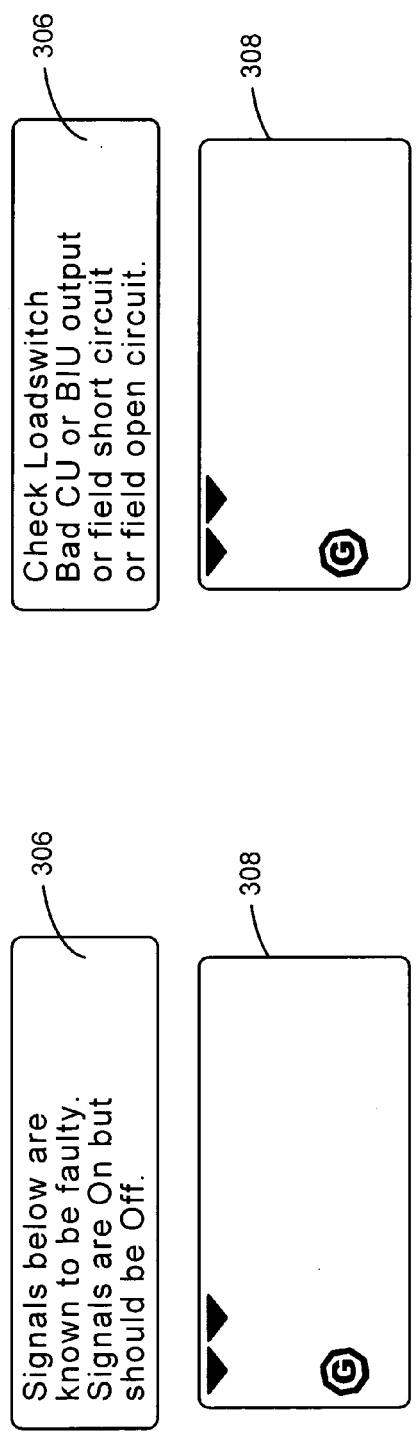
FIG. 7D

METHODS AND APPARATUS FOR AN IMPROVED SIGNAL MONITOR

CROSS-REFERENCE TO RELATED APPLICATION

This application claims priority to U.S. Provisional Patent Application No. 60/589,301, Filed Jul. 19, 2004, the contents of which are hereby incorporated by reference.

FIELD OF THE INVENTION

The present invention generally relates to traffic control devices and, more particularly, to a signal monitor—sometimes referred to as a "malfunction management unit" (MMU) or "conflict monitor unit" (CMU)—incorporating advanced diagnostic and set-up capabilities accessed through an interactive, display-based user interface.

COMPUTER PROGRAM LISTING

A computer program listing appendix in the form of a compact disc is included herewith, and is hereby incorporated by reference.

BACKGROUND

A signal monitor is a device used in traffic control assemblies to detect and respond to conflicting or otherwise improper signals. Such improper signals may arise, for example, due to field signal conflicts, a malfunctioning controller, faulty load switches, cabinet mis-wiring, improper supply voltages, and the like.

Given the complexity of modern traffic control equipment, it is often difficult for field operators to diagnose and repair cabinet malfunctions. More particularly, while conventional signal monitor units typically display information related to the fault condition itself (i.e., conflicting traffic signals, etc.), the information presented to the operator is not in a form that allows rapid diagnosis. For example, known systems typically present so much information to the operator that it is difficult to pinpoint the particular cause of failure. Furthermore, known systems do not include effective troubleshooting aids that can assist the operator in diagnosing and resolving the underlying malfunction.

SUMMARY OF THE INVENTION

The present invention relates to a signal monitor (often referred to herein as a "malfunction management unit," or simply "MMU") with advanced diagnostic capabilities which incorporates diagnostic and set-up capabilities accessed through a display-based user interface. In general, the MMU is capable of displaying (1) monitor status information, wherein the monitor status information includes information relating to the status of at least a portion of the input signals; and (2) diagnostic information, wherein the diagnostic information includes an indication of fault type, an indication of faulty signals, and troubleshooting information associated with said fault type and relevant faulty signals. The diagnostic information itself includes a textual interpretation of the results of a field check analysis. In this way, even inexperienced technicians are capable of accurately and quickly diagnosing cabinet malfunctions.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIGS. 7A–7D show an example of the progression of diagnostic displays in fault mode.

DETAILED DESCRIPTION

In general, the present invention relates to a signal monitor of the type used in connection with traffic control systems, and which incorporates diagnostic and set-up capabilities accessed through a display-based user interface. In general, the signal monitor is capable of displaying (1) monitor status information, wherein the monitor status information includes information relating to the status of at least a portion of the input signals; and (2) diagnostic information, wherein the diagnostic information includes an indication of fault type, an indication of faulty signals, and troubleshooting information associated with said fault type and relevant faulty signals. To further aid the operator, the diagnostic information includes a textual interpretation/analysis of the results of a field check analysis. That is, one or more segments or pages of diagnostic information are presented to the operator in textual form, and a portion of that information relates to an analysis of whether the field signals (e.g., signal outputs from the load switches) match the corresponding instructions from the controller.

In this regard, the description that follows is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention.

While different industry specifications use different terms and acronyms when referring to signal monitors, the present invention is not so limited. Thus, the specific term "malfunction management unit" as used herein refers to any type of signal monitor now known or later developed.

Figure 1:
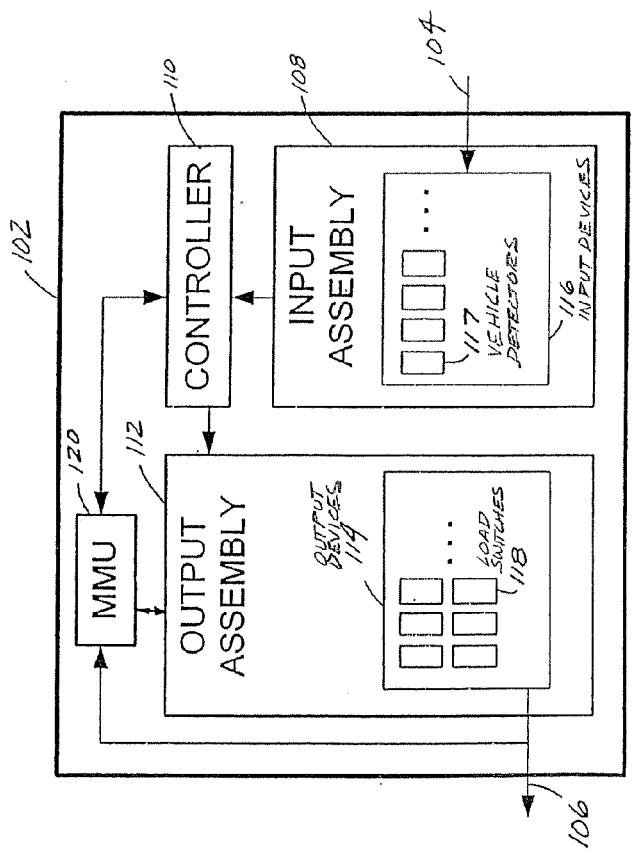
FIG. 1 is a schematic overview depicting the components of a typical traffic control cabinet in which the present invention may be deployed.

Referring to FIG. 1, a typical intersection cabinet (or simply "cabinet") 102 generally contains an input assembly 108, and output assembly 112, a controller 110, and a malfunction management unit (MMU) 120. Those skilled in the art will appreciate that such cabinets vary greatly with respect to both design and components.

As described above, a malfunction management unit (MMU) is a device used in traffic controller assemblies and other applications to detect and respond to conflicting or otherwise improper signals caused by a malfunctioning controller, faulty load switches, cabinet mis-wiring, improper supply voltages, or other such failure mechanisms. MMU units are typically configured as a 16-channel monitor, but may also have 32 channels, 12 channels, 6 channels, or any other number of channels.

The general functional requirements of conventional MMU units are well-known, and are in fact covered by a variety of standards, including, for example, National Electrical Manufacturers Association (NEMA) TS2-2003, Traffic Controller Assemblies with NTCIP Requirements, v02.06, NEMA TS1-1989 (rev. 2000), Traffic Control Systems, AASHTO/ITE/NEMA Intelligent Transportation Systems (ITS) Standard Specification for Roadside Cabinets, v 01.02.15, Caltrans Transportation Electrical Equipment Specifications (TEES), August 2002. All of these standards are hereby incorporated by reference.

With continued reference to FIG. 1, input assembly 108 typically includes an array 116 of input devices (such as vehicle detectors 117) which receive input signals (104) from the intersection environment through imbedded inductive loops and other such sensors. Similarly, output assembly 112 typically includes a set 114 of output devices (such as load switches 118) which communicate with the environment (via output 106) to effect traffic control via activation of the appropriate traffic signals. To do so, controller 110 communicates with and controls the various assemblies within cabinet 102. The present invention is not limited, however, to specific controller units or communication protocols.

In the illustrated embodiment, and in accordance with the present invention, MMU 120 can be configured such that it receives and processes signals not only from output assembly 112, but also controller 110. In this way, MMU 120 provides "field checking." That is, MMU 120 is capable of determining the output of load switches 118 while at the same time monitoring what controller 110 has instructed those outputs to be. When field check is enabled for a particular channel or input, MMU 120 can check whether the actual device signals for that channel or input match the desired signal specified by controller 110.

Figure 2:
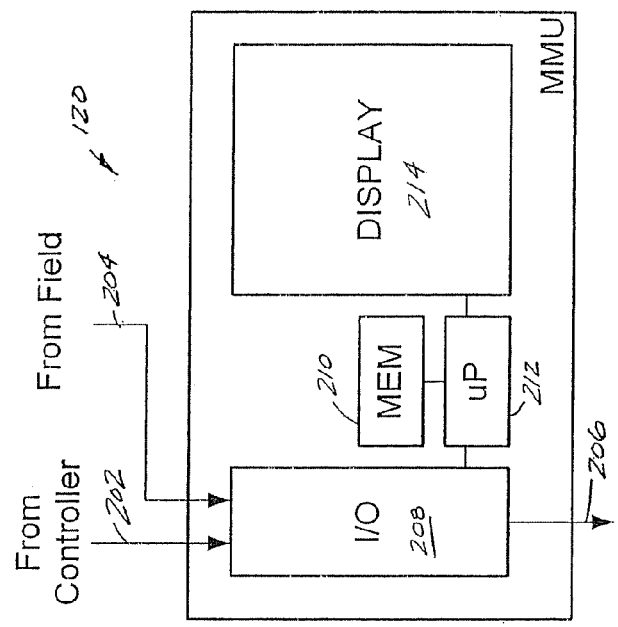
FIG. 2 is a schematic overview of a MMU in accordance with the present invention.

As shown in FIG. 2, an MMU 120 in accordance with the present invention generally includes a display 214, a memory 210 (e.g., RAM, ROM, EEPROM, or combination thereof), a microprocessor or microcontroller 212, and input output (I/O) circuitry (or simply "I/O") 208. I/O 208 receives signals 202 from the controller as well as signals 204 from the various load switches in the output assembly (i.e., the "field"). I/O 208 also produces output 206, which may be used, for example, to place the traffic intersection into emergency mode (e.g., via flashing red intersection signals) in the event of a fault.

Display 214 of MMU 120 comprises one or more display components capable of displaying information pertinent to the operation of MMU 120 as discussed below. In this regard, display 214 may include one or more displays of any type now known or developed in the future, including without limitation liquid crystal displays (LCDs), light emitting diode (LED) displays, electroluminescent displays, and the like. Similarly, such displays might be general-purpose, pixel-based displays or custom displays with dedicated display components ("icon-based"), or a combination thereof. Display 214 is preferably interactive (or "navigable") in that its displayed content is responsive to some form of user input—e.g., the use of buttons, touch screen signals, or any form of direct or indirect input.

Figure 3:
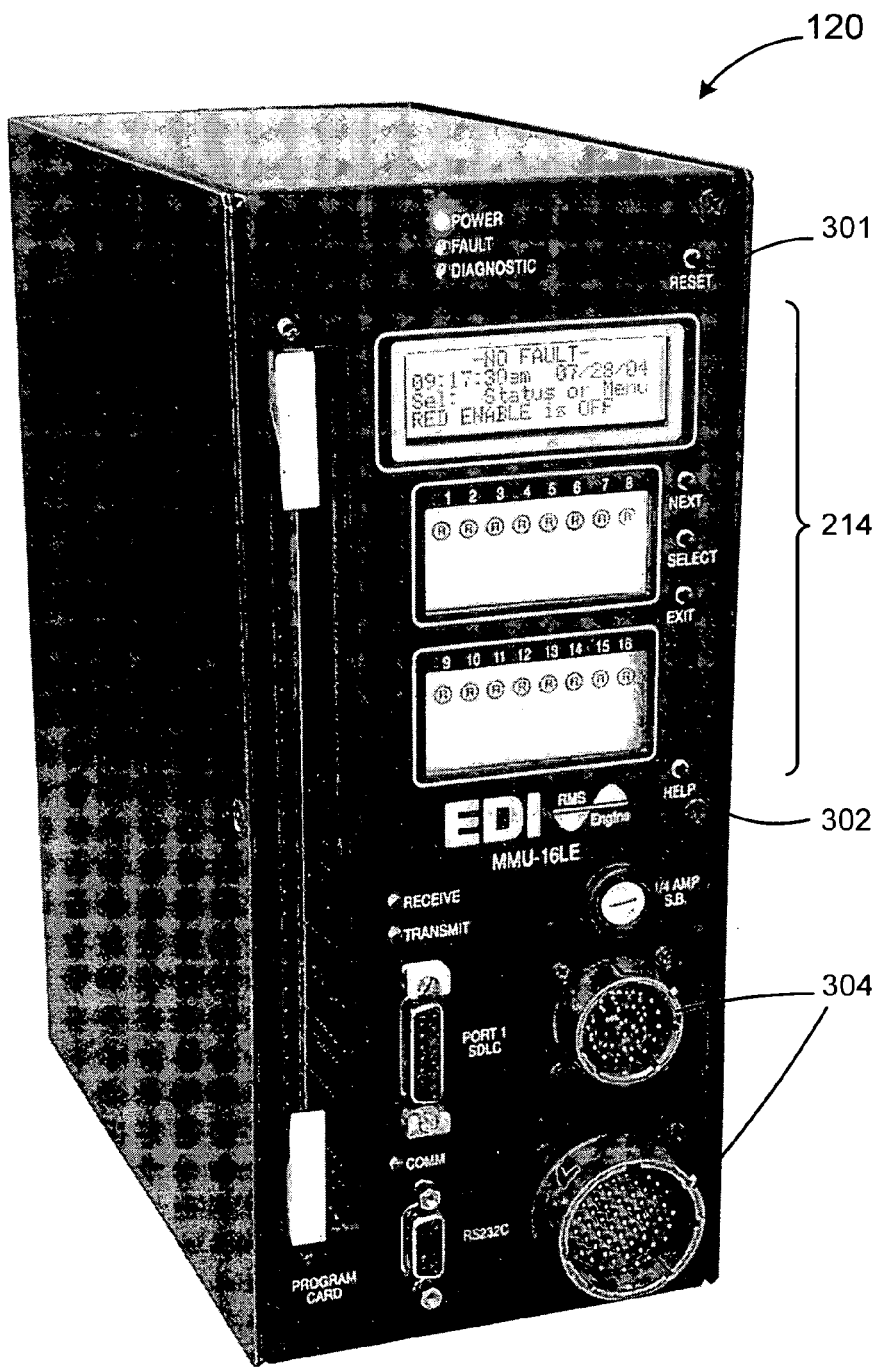
FIG. 3 is an illustration of a front-panel display configuration in accordance with one embodiment of the present invention.

Referring now to FIG. 3, an MMU 120 in accordance with the illustrated embodiment comprises a front panel 301 having an integral display region 214 comprising an alphanumeric display 306 and two intersection status displays 308 and 309. Front panel 301 also includes, among other things, a button or other such actuation device 302, and suitable I/O connectors 304. The present invention is not limited to any particular size, shape, geometry, or configuration of inputs and outputs.

Figure 4:
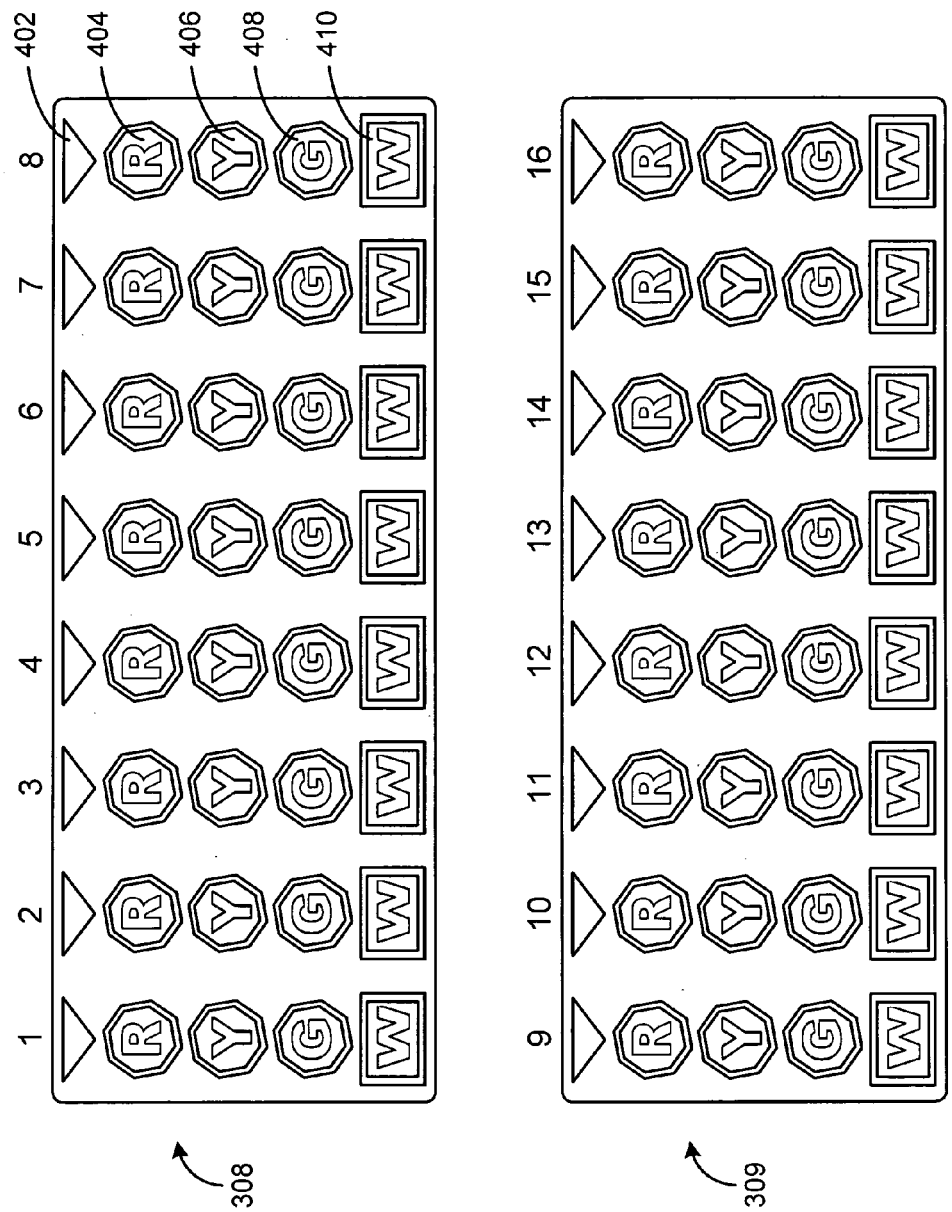
FIG. 4 is an illustration of exemplary intersection status displays.

FIG. 4 shows an example of suitable intersection status displays 308 and 309. As shown, displays 308 and 309 include a total of 16 columns, each corresponding to a different channel or approach lane associated with the intersection. Each column includes five indicators: a channel indicator 402, a red indicator 404, a yellow indicator 406, a green indicator 408, and a walk indicator 410. It will be appreciated that only a subset of these indicators may be used, depending on how the intersection is mapped to the channels, how the MMU is configured, and whether certain standards (TS2, TS1, etc., previously referenced) are applicable.

Figure 5A:
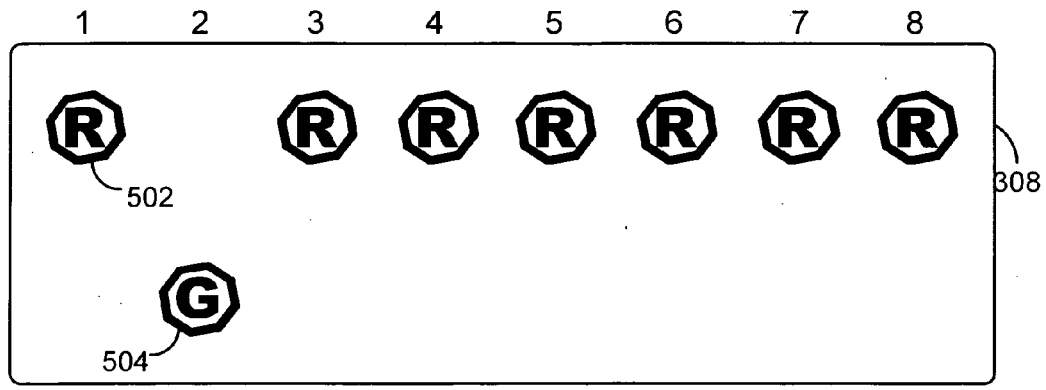
FIGS. 5A–5C show the progression of an example intersection status display under normal operating conditions.
Figure 5B:
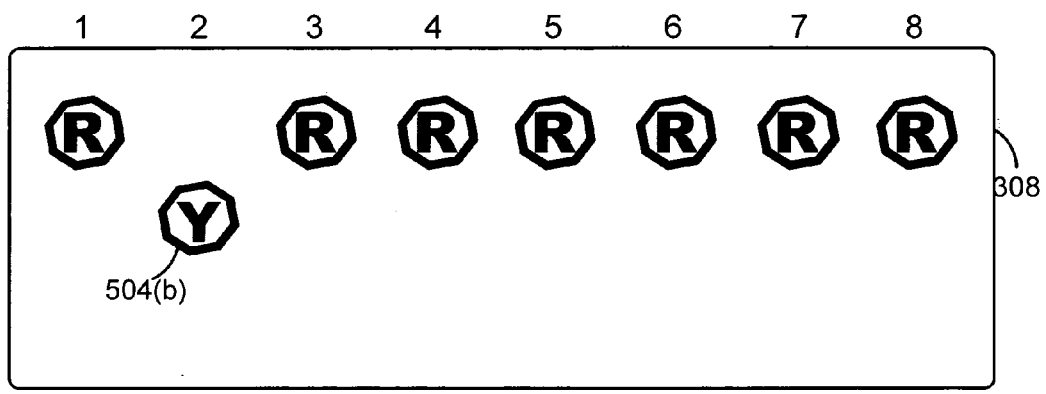
Figure 5C:
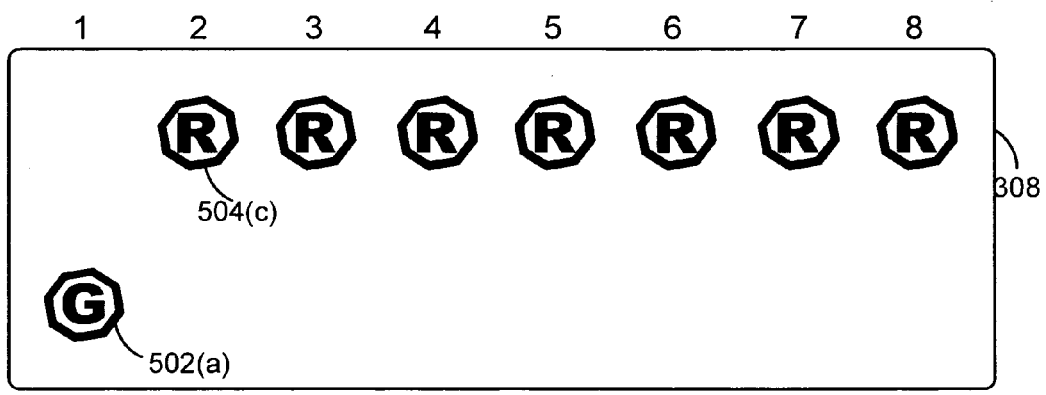

During normal operation, displays 308 and 309 show the status of the various intersection channels (i.e., "monitor status information"). As shown in FIGS. 5A–5C, for example, channel 1 might initially display a red indicator 502 while channel 2 displays a green indicator 504 (FIG. 5A). At the appropriate time, channel 2 would switch to a yellow indicator 504($b$) (FIG. 5B), and eventually a red indicator 504($c$), at which time channel 1 would change to a green indicator 502($a$). The term "indicator" as used herein is not limited to a dedicated display element, but encompasses pixel-based displays and the like.

In the event some form of malfunction occurs at the intersection, the MMU enters into a fault mode to assist the operator in diagnosing and troubleshooting the problem. Fault mode may be entered automatically when a fault condition has been detected.

Figure 6:
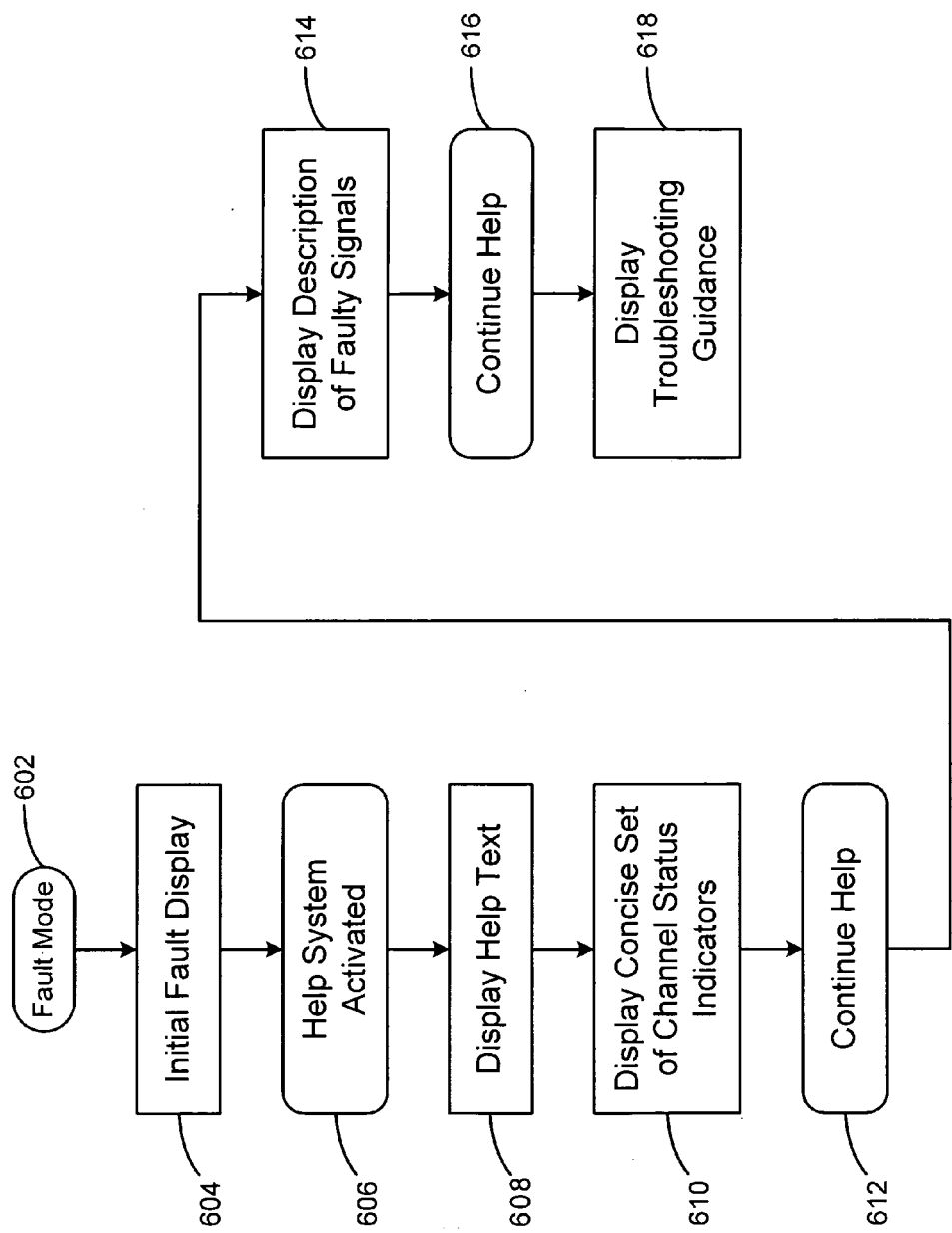
FIG. 6 is a flowchart showing an exemplary diagnostic procedure.

In general, referring to FIG. 6, the diagnostic process involves a number of successive displays. Initially, when the system enters fault mode (602), a description of the initial fault is displayed (604). In step 606, the help system is then activated (e.g., by the user pressing button 302 shown in FIG. 3). Alphanumeric display 306 then presents the appropriate help text while displays 308 and 309 present a concise set of channel status indicators (steps 608 and 610); that is, only a relevant subset of channel status indicators remain displayed.

After reviewing the presented information, the operator may further continue the help process (again, by pressing button 302) (step 612). At this point, the system displays a description of the known faulty signals (step 614). Further continuing the help process (step 616), results in a display of troubleshooting guidance (step 618). It will be appreciated that this invention contemplates that this process may be carried out in fewer or more steps.

FIGS. 7A–7D depict one example of the successive displays occurring during a fault—specifically, a conflict-type fault. This example corresponds to a TS2 type fault with field check enabled where the channel 1 green signal is "on", but should be "off".

As shown in FIG. 7A, the initial fault display includes a basic description of the fault (display 306), and a display of which signals were active at the time of fault (display 308). After the help system is activated (FIG. 7B), display 306 presents a first level of help text, and display 308 is modified to present a concise set of channel status indicators. That is, display 308 focuses on channels 1 and 2, and the remaining indicators are extinguished so as not to confuse the operator.

Next, as shown in FIG. 7C, the help processes continues with a description of the known faulty signals (display 306) referencing a further simplified display 308, which indicates that the channel 1 green signal is "on" when it should not be. The system therefore displays diagnostic information that includes a textual interpretation of the results of the field check analysis. Finally, as shown in FIG. 7D, display 306 presents troubleshooting guidance designed to assist the operator or field technician in determining the root cause of the fault.

Figure 8:
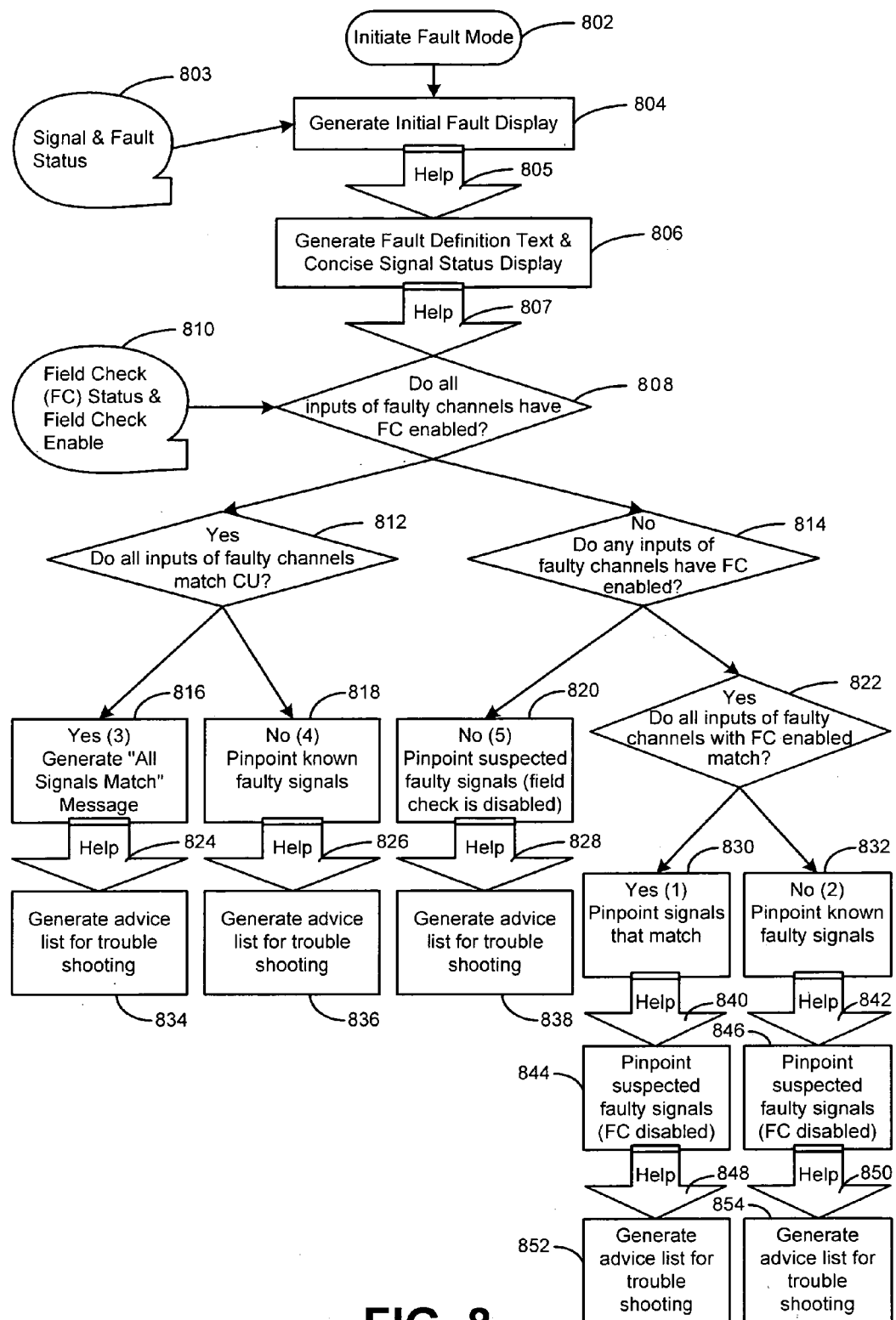
FIG. 8 is a flowchart showing an exemplary high-level diagnostic procedure.

As a further example, FIG. 8 shows a high-level fault mode decision tree applicable to the present invention. Those skilled in the art will recognize the nature of this flowchart and the content of the various boxes. In general, the decision tree progresses from initiation of fault mode (802), to a determination of the general fault categories (boxes 816, 818, 820, 830, and 832). A computer program listing is included herewith that sets forth a particular embodiment for providing the relevant troubleshooting information.

In the illustrated embodiment, there are five categories, depending generally upon (a) whether and to what extent field checking is enabled, (b) whether the inputs to fault channels match their respective control unit outputs, and (c) the faulty signals themselves. Once the individual category of fault is determined, the system continues with the context-specific help/diagnostic system. The initial fault display is generated in step 804, and the fault definition text and concise signal display are generated in step 806 after the operator presses the "help" key (or provides any suitable input) 805. For example, the help screens shown in FIG. 7 correspond to a category 4 fault (steps 804, 806, 808, 812, 818, 836).

If all inputs of the faulty channels have field check enabled (as determined from data 810), the system continues at step 812. Otherwise, the system continues with step 814. Under step 812, if all inputs of the faulty channels match the control unit, processing continues with successive steps 816 and 834, which present the operator with an "all signals match" message and troubleshooting advice. Alternatively, if any inputs of the faulty channels do not match the control unit, the known faulty signals are pinpointed (818), and further troubleshooting advice is presented to the operator (836).

With respect to step 814, corresponding to the case where not all inputs of the faulty channels have field check enabled, the system then determines whether any inputs are so enabled, then branches to steps 820 and 822 accordingly. In step 820, the system displays the potential (suspected) faulty signals as well as a setup warning regarding field check disable limitations. In step 838 the system generates further troubleshooting advice.

In step 822, however, the system further checks whether all inputs of the faulty channels with field check enabled match. If so, processing continues with steps 830, wherein matching signals are pinpointed. In step 844, the system then displays the remaining potential (suspected) faulty signals as well as a setup warning regarding field check disable limitations. In step 852 the system generates further troubleshooting advice.

If the result of step 822 is "No," then the known faulty signals are pinpointed (832), the system then displays the remaining potential (suspected) faulty signals as well as a setup warning regarding field check disable limitations (846). In step 854 the system generates further troubleshooting advice.

In accordance with another aspect of the present invention, the MMU incorporates an advanced setup algorithm that assists the technician in accomplishing initial setup of the system at an intersection. More particularly, the setup algorithm asks a series of questions regarding the intersection geometry and operation. It then uses these responses to formulate the detailed monitor configuration parameters automatically. This eliminates the need for the technician to understand the individual monitor settings and the criteria used to determine these settings.

In general, the setup algorithm converts the highly-technical signal monitor language to a system that can be easily understood by non-experts. For example, in accordance with one embodiment, these questions (or prompts), include: "Select unused channels"; "Are pedestrian 'Don't Walk' signals monitored?"; "Select pedestrian channels"; and "Select protected-permissive turn channels.

The answers received in response to these prompts (through a suitable front-panel interface) are then used to configure, for example, the parameters for dual-indication monitoring, red fail monitoring, minimum yellow+red clearance monitoring, and field check monitoring. These parameters, in conjunction with other parameters and the jumpers placed on the standard program card, are used to configure the monitor.

Other advantages and structural details of the invention will be apparent from the attached figures, which will be well understood by those skilled in the art. The present invention has been described above with respect to a particular exemplary embodiment. However, many changes, combinations and modifications may be made to the exemplary embodiments without departing from the scope of the present invention.

The invention claimed is:

1. A signal monitor of the type configured to accept a plurality of input signals associated with traffic control at an intersection, said signal monitor comprising:
   an interactive display capable of providing a visual representation of:
   a) monitor status information, wherein said monitor status information includes information relating to the status of at least a portion of said plurality of input signals;
   b) diagnostic information, wherein said diagnostic information includes an indication of fault type, an indication of faulty input signals, and troubleshooting information associated with said fault type and faulty input signals, wherein said diagnostic information includes a textual interpretation of the results of a field check analysis performed on said input signals.

2. The signal monitor of claim 1, wherein said indication of faulty signals comprises a concise display of relevant fault signals.

3. The signal monitor of claim 1, wherein said troubleshooting information includes a list of probable causes associated with said fault type and indication of faulty signals.

4. The signal monitor of claim 1, wherein said interactive display is further capable of displaying historical fault information.

5. The signal monitor of claim 1, wherein said diagnostic information is provided to the operator in the form of a set of successive display pages.

6. A method of processing faults sensed by a malfunction management unit (MMU) coupled to a plurality of inputs, comprising the steps of:
   a) sensing a fault condition associated with said plurality of inputs;
   b) displaying diagnostic information related to said fault condition via an interactive display, wherein said diagnostic information includes an indication of a fault type associated with said fault condition, an indication of faulty signals attending said fault condition, and troubleshooting information associated with said fault condition, wherein said diagnostic information includes a textual interpretation of the results of a field check analysis performed on said input signals.

7. The method of claim 6, wherein said step of providing an indication of faulty signals includes the step of providing a concise display of relevant fault signals.

8. The method of claim 6, wherein said step of providing troubleshooting information includes the step of listing probable causes associated with said fault condition.

9. The method of claim 6, wherein said step of displaying diagnostic information includes the step of providing diagnostic information in a set of successive pages navigable by an operator.

10. A computer-readable medium having program code embodied therein for causing a malfunction management unit (MMU) to perform the steps of:
    a) sensing a fault condition associated with a plurality of inputs to the MMU;
    b) performing a field check analysis on said inputs;
    c) displaying diagnostic information related to said fault condition via an interactive display, wherein said diagnostic information includes an indication of a fault type associated with said fault condition, an indication of faulty signals attending said fault condition, and troubleshooting information associated with said fault condition, wherein said diagnostic information includes a textual interpretation of the results of said field check analysis.

11. The computer-readable medium of claim 10, wherein said step of providing an indication of faulty signals includes the step of providing a concise display of relevant fault signals.

12. The computer-readable medium of claim 10, wherein said step of providing troubleshooting information includes the step of listing probable causes associated with said fault condition.

13. The computer-readable medium of claim 10, wherein said step of displaying diagnostic information includes the step of providing diagnostic information in a set of successive pages navigable by an operator.

14. An interactive display for use in a memory management unit (MMU), said display configured to produce a visual representation of (a) monitor status information, wherein said monitor status information includes information relating to the status of at least a portion of said plurality of input signals; and (b) diagnostic information, wherein said diagnostic information includes an indication of fault type, an indication of faulty signals, and troubleshooting information associated with said fault type and relevant faulty signals, wherein said diagnostic information includes a textual interpretation of the results of a field check analysis.

* * * * *